(12) United States Patent
Yeluri et al.

(10) Patent No.: US 8,621,100 B1
(45) Date of Patent: *Dec. 31, 2013

(54) MERGE SYSTEMS AND METHODS FOR TRANSMIT SYSTEM INTERFACES

(75) Inventors: Sharada Yeluri, San Jose, CA (US); Kevin Clark, Santa Cruz, CA (US); Shahriar Ilislamloo, Monte Sereno, CA (US); Chung Lau, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 436 days.

This patent is subject to a terminal disclaimer.

(21) Appl. No.: 12/394,620

(22) Filed: Feb. 27, 2009

Related U.S. Application Data

(63) Continuation of application No. 10/197,484, filed on Jul. 18, 2002, now Pat. No. 7,519,728.

(51) Int. Cl.
*G06F 15/16* (2006.01)
*H04L 12/56* (2011.01)

(52) U.S. Cl.
CPC ............... *H04L 47/10* (2013.01); *H04L 49/90* (2013.01); *Y10S 370/907* (2013.01)
USPC ........... 709/234; 709/232; 709/233; 709/235; 709/236; 709/230; 709/231; 710/29; 710/30; 710/33; 710/34; 710/35; 710/52; 710/56; 710/308; 370/229; 370/235; 370/468; 370/470; 370/472; 370/476; 370/412; 370/466; 370/477; 370/505; 370/517; 370/907

(58) Field of Classification Search
USPC ......... 370/412–421, 428, 252, 465, 503, 229, 370/235, 466, 468, 470, 472, 476, 477, 505, 370/517, 907; 710/52, 56–57, 71–72, 307, 710/310, 29, 30, 33, 34, 35, 308; 709/230, 709/231, 232, 233, 234, 235, 236
See application file for complete search history.

(56) References Cited

U.S. PATENT DOCUMENTS

| | | | | |
|---|---|---|---|---|
| 5,650,825 | A * | 7/1997 | Naimpally et al. | 348/465 |
| 5,784,597 | A * | 7/1998 | Chiu et al. | 713/401 |
| 5,809,252 | A * | 9/1998 | Beighe et al. | 709/227 |
| 5,838,934 | A | 11/1998 | Boutaud et al. | |
| 5,966,120 | A * | 10/1999 | Arazi et al. | 715/724 |
| 6,006,303 | A * | 12/1999 | Barnaby et al. | 710/244 |
| 6,016,309 | A * | 1/2000 | Benayoun et al. | 370/252 |
| 6,323,907 | B1 * | 11/2001 | Hwang | 348/457 |
| 6,389,010 | B1 * | 5/2002 | Kubler et al. | 370/353 |
| 6,442,758 | B1 * | 8/2002 | Jang et al. | 725/119 |
| 6,477,181 | B1 * | 11/2002 | Fujimori et al. | 370/476 |
| 6,522,694 | B1 | 2/2003 | Ryan | |

(Continued)

OTHER PUBLICATIONS

Co-pending U.S. Appl. No. 10/197,484, filed Jul. 18, 2002 entitled "Merge Systems and Methods for Transmit System Interfaces", Sharada Yeluri et al., 36 pages.

*Primary Examiner* — Saket K Daftuar
(74) *Attorney, Agent, or Firm* — Harrity & Harrity, LLP

(57) ABSTRACT

A system improves bandwidth used by a data stream. The system receives data from the data stream and partitions the data into bursts. At least one of the bursts includes one or more idles. The system selectively removes the idles from the at least one burst and transmits the bursts, including the at least one burst.

21 Claims, 11 Drawing Sheets

(56) References Cited

U.S. PATENT DOCUMENTS

| | | | |
|---|---|---|---|
| 6,526,462 B1* | 2/2003 | Elabd | 710/242 |
| 6,580,731 B1 | 6/2003 | Denton | |
| 6,581,165 B1* | 6/2003 | Weintraub | 713/600 |
| 6,611,537 B1* | 8/2003 | Edens et al. | 370/503 |
| 6,618,396 B1* | 9/2003 | Kondo et al. | 370/474 |
| 6,629,251 B1 | 9/2003 | Anderson et al. | |
| 6,681,272 B1 | 1/2004 | Anderson et al. | |
| 6,757,367 B1* | 6/2004 | Nicol | 379/90.01 |
| 6,765,931 B1* | 7/2004 | Rabenko et al. | 370/493 |
| 6,781,984 B1* | 8/2004 | Adam et al. | 370/360 |
| 6,882,711 B1* | 4/2005 | Nicol | 379/93.33 |
| 6,891,841 B2* | 5/2005 | Leatherbury et al. | 370/401 |
| 6,891,845 B2* | 5/2005 | Boock et al. | 370/412 |
| 6,910,092 B2* | 6/2005 | Calvignac et al. | 710/310 |
| 6,910,125 B2 | 6/2005 | Wise et al. | |
| 6,934,301 B2* | 8/2005 | Jordan | 370/466 |
| 7,085,849 B1 | 8/2006 | Clark et al. | |
| 7,142,508 B2* | 11/2006 | Tobagi et al. | 370/230 |
| 7,194,563 B2* | 3/2007 | Plourde, Jr. | 710/52 |
| 7,929,576 B2* | 4/2011 | Boyd et al. | 370/505 |
| 2001/0007568 A1* | 7/2001 | Morris | 370/473 |
| 2002/0141544 A1* | 10/2002 | Brown et al. | 379/29.01 |
| 2002/0194517 A1* | 12/2002 | Cohen et al. | 713/340 |
| 2003/0001697 A1 | 1/2003 | Jordan | |
| 2003/0016690 A1* | 1/2003 | Jordan | 370/433 |
| 2003/0016697 A1* | 1/2003 | Jordan | 370/466 |
| 2003/0156652 A1 | 8/2003 | Wise et al. | |
| 2003/0182544 A1 | 9/2003 | Wise et al. | |
| 2003/0196078 A1 | 10/2003 | Wise et al. | |
| 2003/0227969 A1 | 12/2003 | Wise et al. | |
| 2004/0019775 A1 | 1/2004 | Wise et al. | |
| 2004/0025000 A1 | 2/2004 | Wise et al. | |
| 2004/0039903 A1 | 2/2004 | Wise et al. | |
| 2004/0221143 A1 | 11/2004 | Wise et al. | |

* cited by examiner

MERGE SYSTEMS AND METHODS FOR TRANSMIT SYSTEM INTERFACES

RELATED APPLICATION

This application is a continuation of U.S. patent application Ser. No. 10/197,484, filed Jul. 18, 2002, the contents of which are incorporated herein by reference.

BACKGROUND OF THE INVENTION

1. Field of the Invention

The present invention relates generally to data transfer and, more particularly, to systems and methods for improving traffic bandwidth.

2. Description of Related Art

Network devices, such as routers, receive data on physical media, such as optical fiber, analyze the data to determine its destination, and output the data on physical media in accordance with the destination. Routers were initially designed using a general purpose processor executing large software programs. As line rates and traffic volume increased, however, general purpose processors could not scale to meet the new demands. For example, as new functions, such as accounting and policing functionality, were added to the software, these routers suffered performance degradation. In some instances, the routers failed to handle traffic at line rate when the new functionality was added.

To meet the new demands, purpose-built routers were designed. Purpose-built routers are designed and built with components optimized for routing. They not only handle higher line rates and higher network traffic volume, but they also add functionality without compromising line rate performance.

A conventional purpose-built router may include a number of input and output ports from which it receives and transmits streams of data packets. A switching fabric may be implemented in the router to carry the packets between the ports. In a high-performance purpose-built router, the switching fabric may transmit a large amount of data between a number of internal components.

The ports of a conventional router may, individually or in combination handle multiple packet streams. As a result, chip-to-chip communication inside a router may include multiple or single stream communications. The chip-to-chip communication may include a high speed interface to facilitate the multiple or single stream communication. To realistically handle the high speed data transfers, the internal transfers of packets or bursts need to occur at a slower speed for ease of implementation. The result is that this slower speed data transfer needs to be wide (e.g., 64 bytes or 128 bytes). The higher the speed of the external transfer, the wider the internal transfer becomes.

The interface may use a protocol that requires all data bursts on the internal transfer, except for end-of-packet bursts, to be multiples of 16 bytes. Not all packets, however, include data that is a multiple of 16 bytes. This results in one or more idles being generated to fill the burst at the end of a packet. The presence of idles results in an under-utilization of bandwidth. The wider the internal transfer is then the greater the bandwidth reduction becomes because of the idles.

As a result, there is a need for systems and methods that better utilize bandwidth by minimizing the occurrence of idles at the end of a packet.

SUMMARY OF THE INVENTION

Systems and methods consistent with the principles of the invention address this and other needs by packing data from one or more streams to eliminate idles and maximize bandwidth use.

One aspect consistent with the principles of the invention includes a system that improves bandwidth used by a data stream. The system receives data from the data stream and partitions the data into bursts. At least one of the bursts includes one or more idles. The system selectively removes the idles from the at least one burst and transmits the bursts, including the at least one burst.

In another aspect of the invention, a network device includes forwarding engines coupled to a switch fabric. Each of the forwarding engines are configured to receive packets from multiple packet streams and partition the packets into bursts, where at least one of the bursts is not completely filled with data. The forwarding engine is further configured to multiplex the bursts from the packet streams, selectively pack the at least one burst with data to fill the at least one burst with data, and transmit the multiplexed bursts, including the at least one burst.

In yet another aspect of the invention, a transmitter is connected between a wide, slow bus and a narrow, fast bus. The transmitter receives data on the wide, slow bus and partitions the data into bursts, where at least one of the bursts is not completely filled with data. The transmitter packs the at least one burst with data to fill the at least one burst with data and transmits the bursts, including the at least one burst, on the narrow, fast bus.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with principles of the invention pack data from one or more streams to eliminate idles and maximize bandwidth use. Idles typically occur at an end of a packet when the packet size differs from a fixed burst size (e.g., a predetermined maximum burst size) for the stream. The idles may be replaced with data from the same stream or a different stream. As used herein, the term "burst" may refer to a portion or all of a unit of data, such as a packet.

System Configuration

Figure 1:
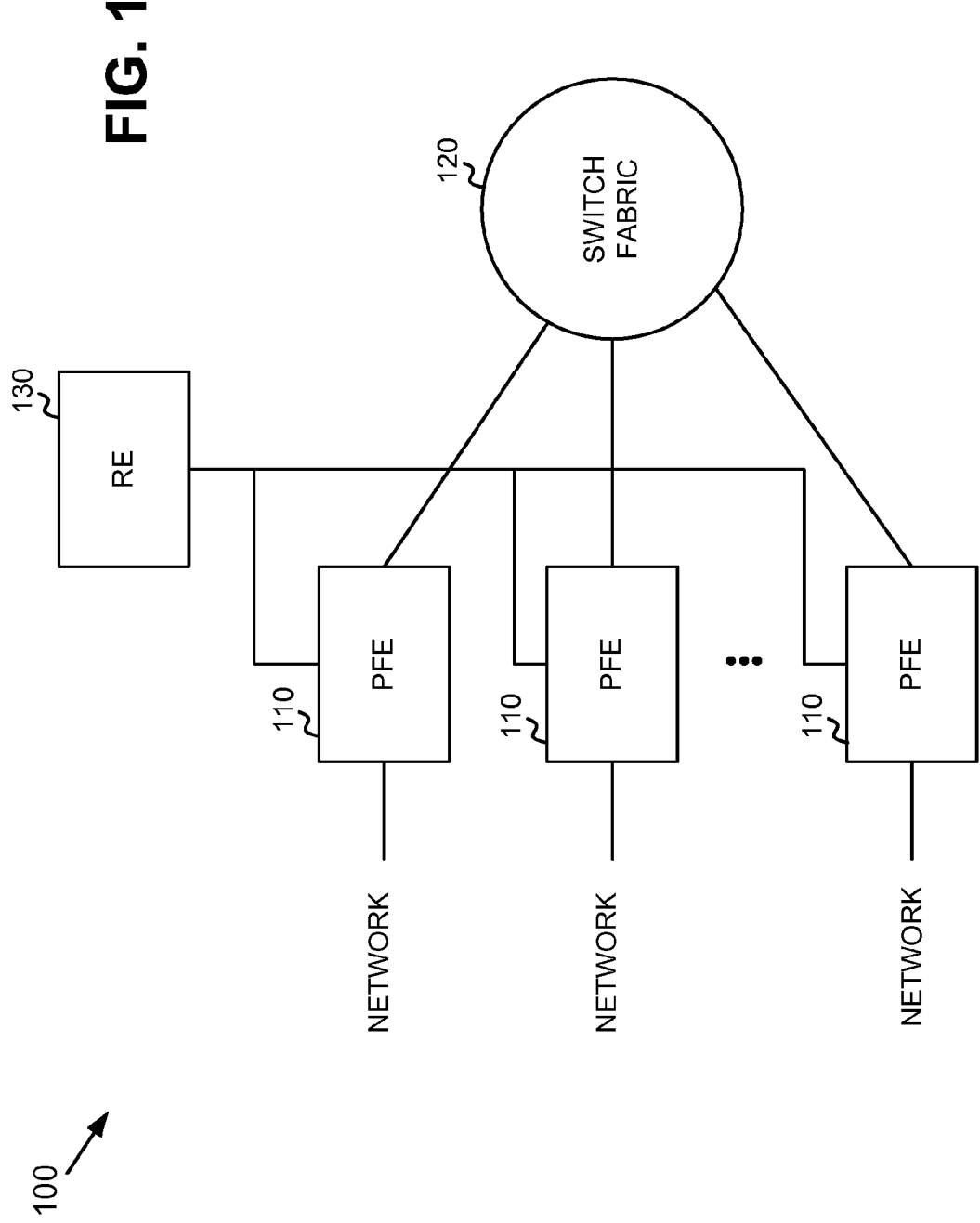
FIG. 1 is a block diagram illustrating an exemplary routing system in which systems and methods consistent with principles of the invention may be implemented.

FIG. 1 is a block diagram illustrating an exemplary routing system 100 in which systems and methods consistent with the principles of the invention may be implemented. System 100 receives one or more packet streams from physical links, processes the packet stream(s) to determine destination information, and transmits the packet stream(s) out on links in accordance with the destination information. System 100 may include packet forwarding engines (PFEs) 110, a switch fabric 120, and a routing engine (RE) 130.

RE 130 performs high level management functions for system 100. For example, RE 130 communicates with other networks and systems connected to system 100 to exchange information regarding network topology. RE 130 may create routing tables based on network topology information, create forwarding tables based on the routing tables, and forward the forwarding tables to PFEs 110. PFEs 110 use the forwarding tables to perform route lookup for incoming packets. RE 130 may also perform other general control and monitoring functions for system 100.

PFEs 110 are each connected to RE 130 and switch fabric 120. PFEs 110 receive packet data on physical links connected to a network, such as a wide area network (WAN) or a local area network (LAN). Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet.

A PFE 110 may process incoming packet data prior to transmitting the data to another PFE or the network. PFE 110 may also perform a route lookup for the data using the forwarding table from RE 130 to determine destination information. If the destination indicates that the data should be sent out on a physical link connected to PFE 110, then PFE 110 prepares the data for transmission by, for example, adding any necessary headers, and transmits the data from the port associated with the physical link. If the destination indicates that the data should be sent to another PFE via switch fabric 120, then PFE 110 prepares the data for transmission to the other PFE, if necessary, and sends the data to the other PFE via switch fabric 120.

Figure 2:
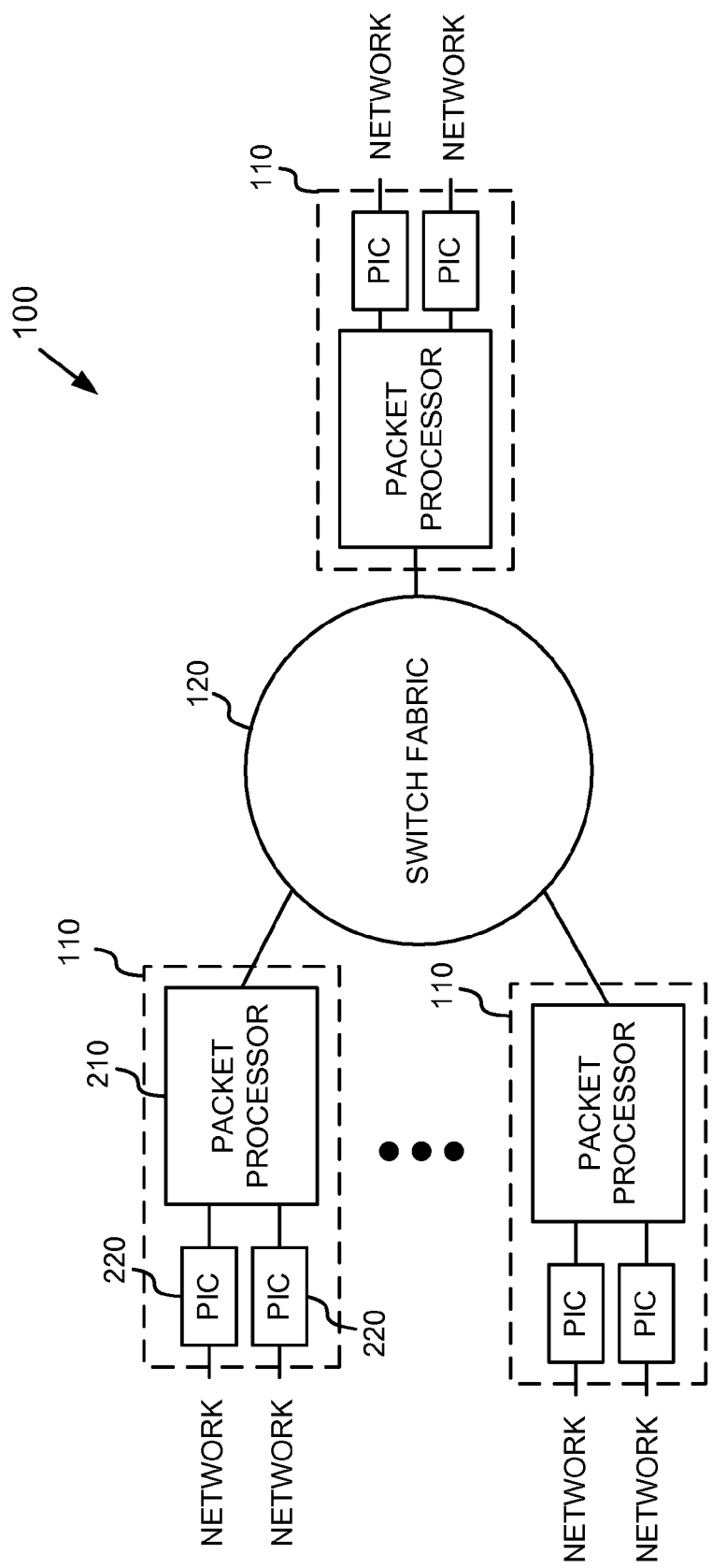
FIG. 2 is a detailed block diagram illustrating portions of the routing system of FIG. 1.

FIG. 2 is a detailed block diagram illustrating portions of routing system 100. PFEs 110 connect to one another through switch fabric 120. Each of PFEs 110 may include one or more packet processors 210 and physical interface cards (PICs) 220. Although FIG. 2 shows two PICs 220 connected to each of packet processors 210 and three packet processors 210 connected to switch fabric 120, in other embodiments consistent with principles of the invention there can be more or fewer PICs 220 and packet processors 210.

Each of packet processors 210 performs routing functions and handles packet transfers to and from PICs 220 and switch fabric 120. For each packet it handles, packet processor 210 performs the previously-discussed route lookup function and may perform other processing-related functions.

PIC 220 may transmit data between a physical link and packet processor 210. Different PICs may be designed to handle different types of physical links. For example, one of PICs 220 may be an interface for an optical link while another PIC 220 may be an interface for an Ethernet link.

Figure 3:
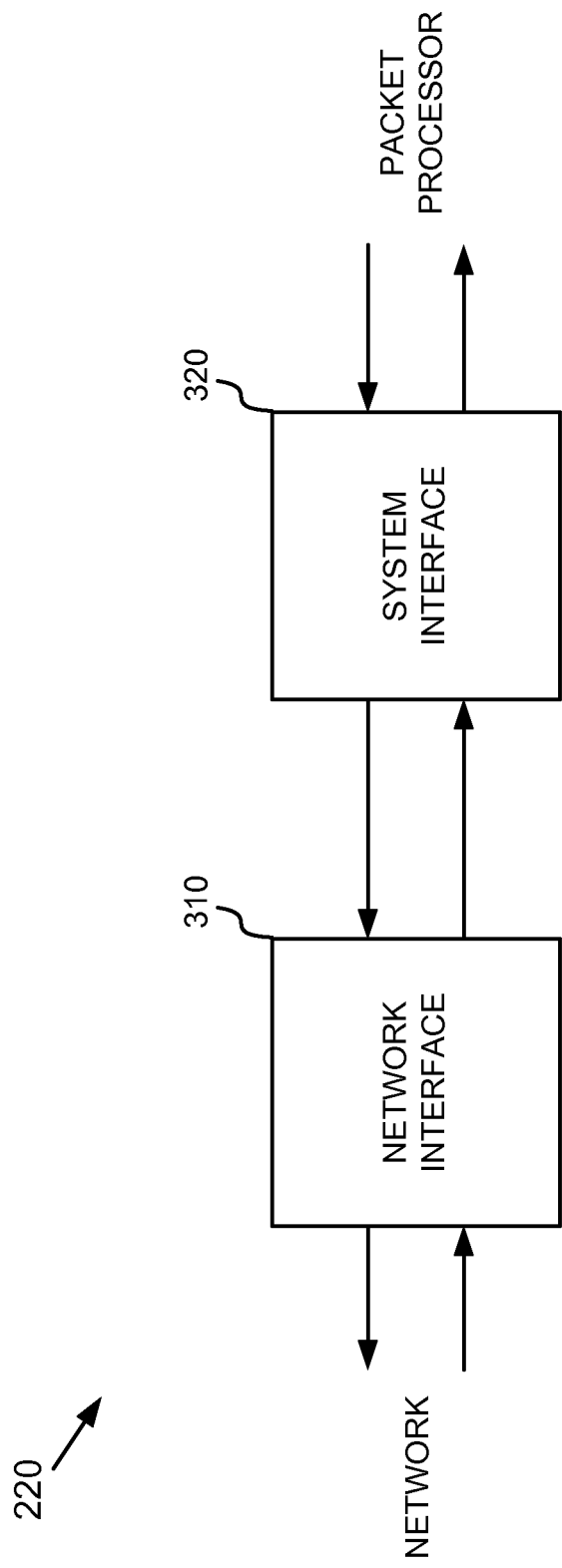
FIG. 3 is an exemplary diagram of a physical interface card of FIG. 2 according to an implementation consistent with the principles of the invention.

FIG. 3 is an exemplary diagram of a PIC 220 consistent with the principles of the invention. PIC 220 may include a network interface 310 and a system interface 320. While FIG. 3 shows network interface 310 and system interface 320 located entirely within PIC 220, in other implementations consistent with the principles of the invention, system interface 320 and/or network interface 310 may be located within packet processor 210.

Network interface 310 may connect to the physical link and system interface 320 may connect to packet processor 210. Network interface 310 may contain logic to receive and process multiple streams (or a single stream) of packets for transmission to system interface 320 or the physical link. For example, network interface may add L1 or L2 header information to a packet prior to transmitting the packet on the physical link.

System interface 320 may include logic to receive and process multiple streams (or a single stream) of packets for transmission to network interface 310 or packet processor 210. For example, system interface 320 may separate a packet into data units used by packet processor 210.

Figure 4:
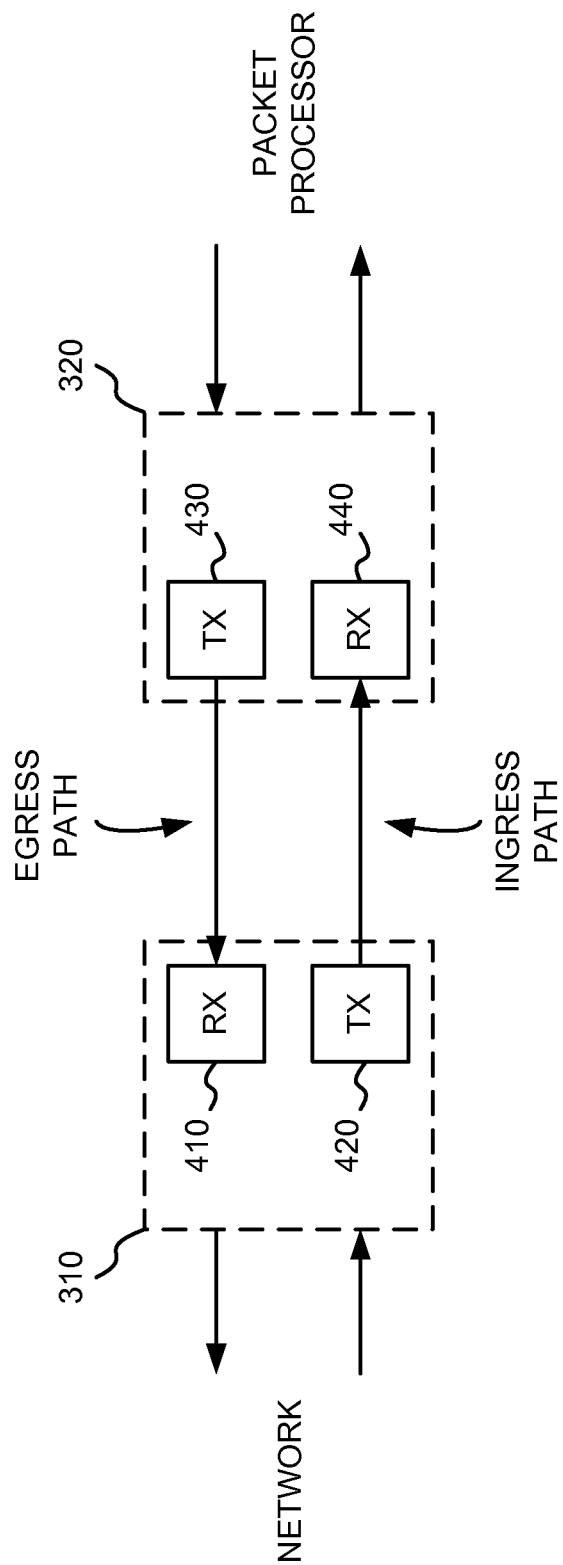
FIG. 4 is an exemplary detailed diagram of portions of the network interface and the system interface of FIG. 3 in an implementation consistent with the principles of the invention.

FIG. 4 is an exemplary detailed diagram of portions of network interface 310 and system interface 320 in an implementation consistent with the principles of the invention. Network interface 310 may include receiver (RX) 410 and transmitter (TX) 420. System interface 320 may include transmitter (TX) 430 and receiver (RX) 440.

Transmitter 430 and receiver 410 may be located along an egress path from packet processor 210 to the physical link. Transmitter 420 and receiver 440 may be located along an ingress path from the physical link to packet processor 210. The buses connecting transmitter 430 and receiver 410, and transmitter 420 and receiver 440 may each include a conventional type of high speed bus, such as a PL4 (Packet-Over-SONET (POS) Physical Layer (PHY) Level 4), PL3, PL2, L2, L1, ATM, PCI (Peripheral Component Interconnect), SPI4 (System Packet Interface Level 4), Utopia, or another type of bus. In one implementation consistent with the principles of the invention, the high speed buses include 16-bit buses operating at a frequency greater than 500 MHz.

Figure 5:
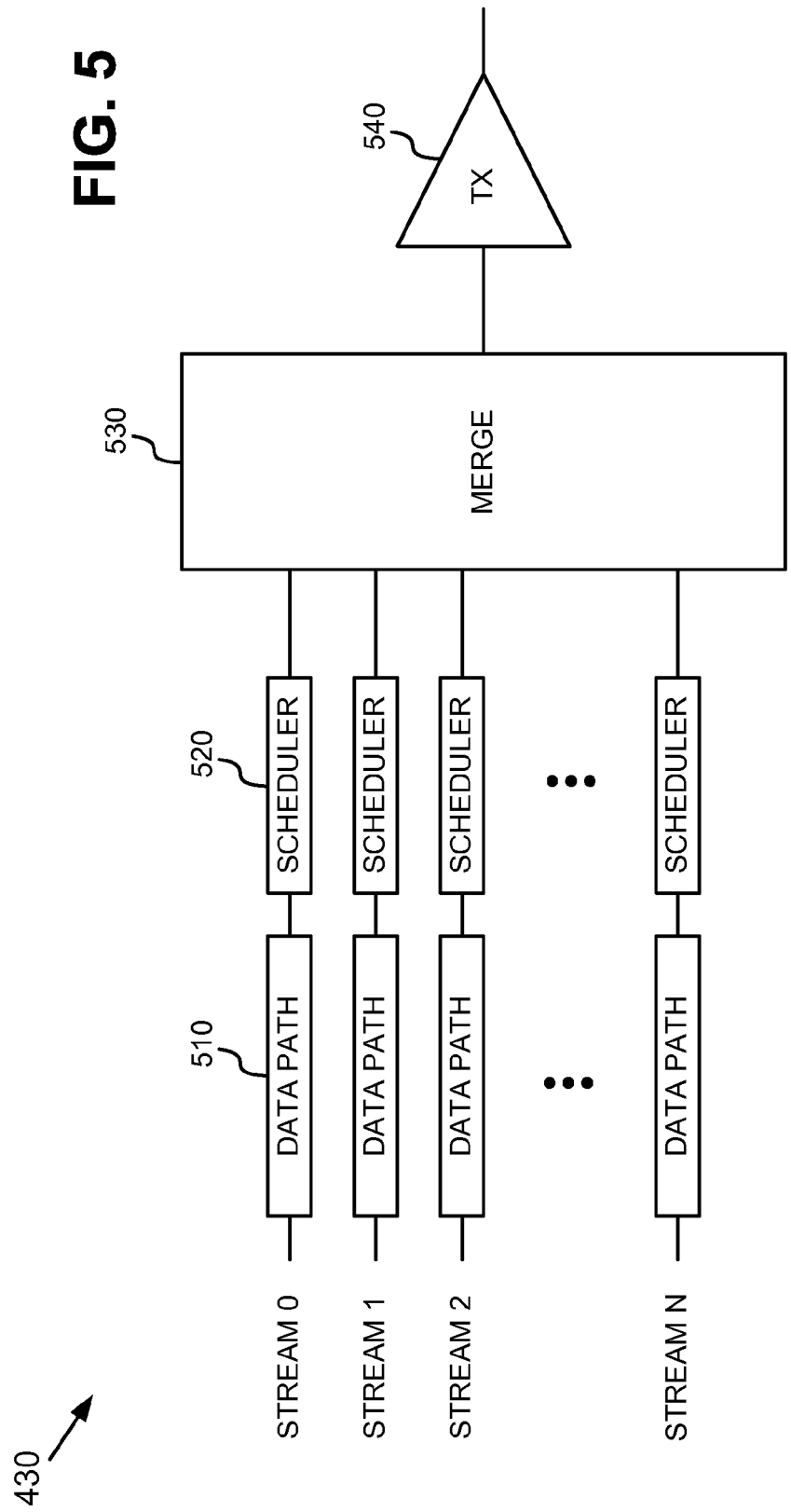
FIG. 5 is an exemplary diagram of the transmitter of FIG. 4 according to an implementation consistent with the principles of the invention.

FIG. 5 is an exemplary diagram of transmitter 430 according to an implementation consistent with the principles of the invention. Transmitter 430 may receive multiple (N) streams of data, where N≥1, and output multiplexed streams. In one implementation, transmitter 430 receives data on a wide, slow bus (e.g., 128 bit-wide, 87.5 MHz bus, or 64 bit-wide, 175 MHz bus) and outputs data on a narrow, fast bus (e.g., 16 hit-wide, 700 MHz bus).

As shown in FIG. 5, transmitter 430 may include multiple data paths 510 and corresponding schedulers 520, merge logic 530, and transmitter logic 540. In one implementation, each of data paths 510 may have a width of 128 bits. A data path 510 may include one or more 128-bit register stages or a larger 128-bit wide memory buffer. In other implementations, data paths 510 may include registers of a different size. Each of data paths 510 may correspond to one of the streams received by transmitter 430 and temporarily buffer packet data received on the corresponding stream.

Scheduler 520 may partition the stream into bursts of data of a particular size (e.g., 64 bytes). The data may include some indication of a start and end of a packet or burst of data, such as start-of-packet (SOP), end-of-packet (EOP), start-of-burst (SOB), and end-of-burst (BOB) control bits, to separate bursts belonging to a particular stream or different streams. In one implementation consistent with the principles of the invention, scheduler 520 outputs bursts that may contain one or more idles. These idles typically occur at the end of a packet or the end of a burst.

Merge logic 530 may multiplex the data received from schedulers 520 on a bus (e.g., a 128-bit bus) for transmission to transmitter logic 540. Merge logic 530 may use a context switch signal from a scheduler 520 in determining when to switch to (or select) the next stream. Merge logic 530 may also include mechanisms (as will be described below) to pack data and remove idles. Merge logic 530 may use control information from scheduler 520 in determining whether to pack data with data from the same stream or another stream.

Transmitter logic 540 may include a conventional transmitter that receives the data from merge logic 530 on a bus N*M bits wide at a frequency X/M MHz and outputs the information on a bus N bits wide at a frequency X MHz to receiver 410 (FIG. 4). In one implementation, N has a value of 16, M has a value of 8, and X has a value of 700. Therefore, in this case, transmitter logic 540 receives information on a 128-bit bus at a frequency of 87.5 MHz and outputs information on a 16-bit bus at a frequency of 700 MHz.

Exemplary Merge Logic

Figure 6:
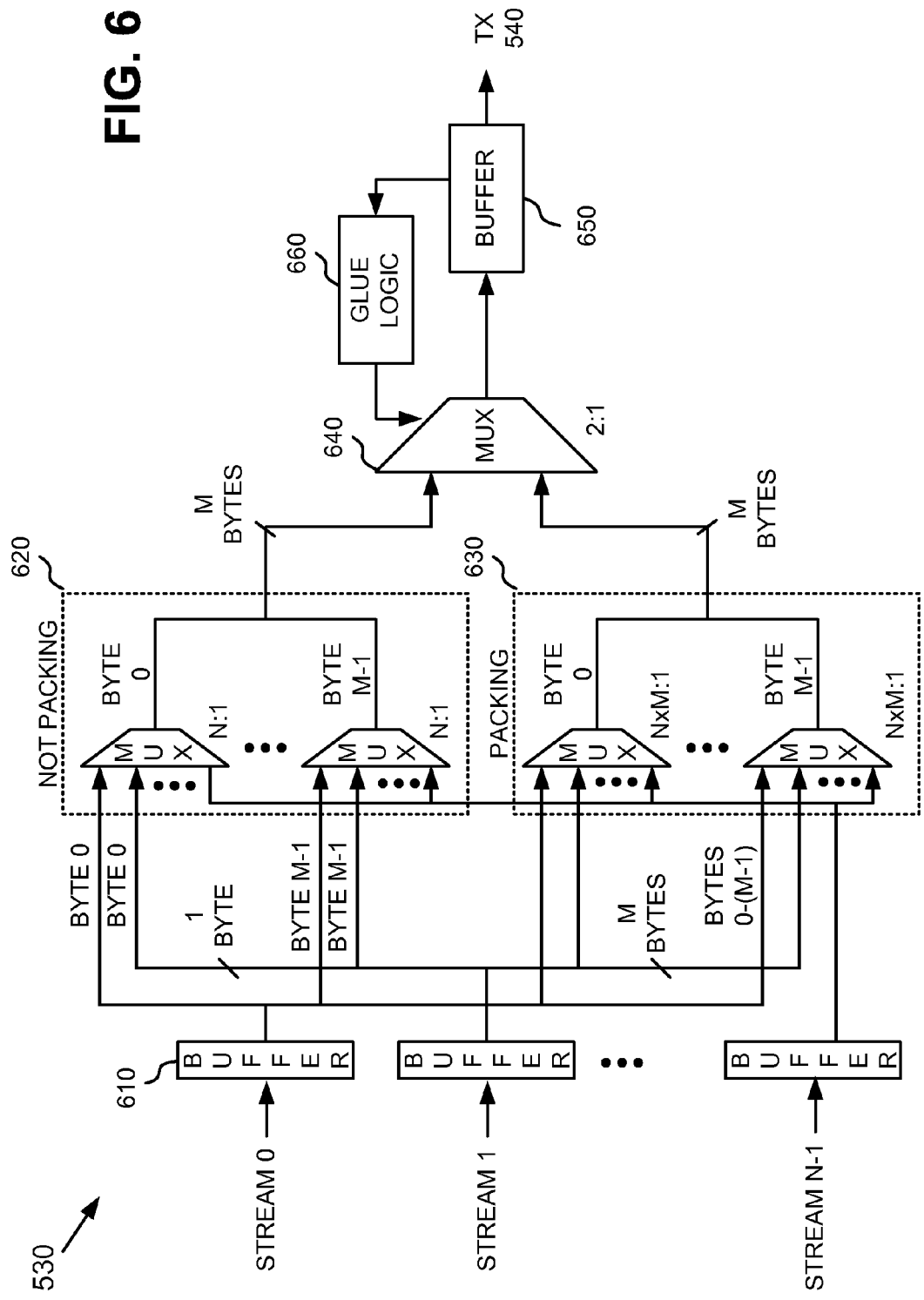
FIG. 6 is an exemplary diagram of a portion of the merge logic of FIG. 5 according to an implementation consistent with the principles of the invention.

FIG. 6 is an exemplary diagram of a portion of merge logic 530 according to an implementation consistent with the principles of the invention. Merge logic 530 may include buffers 610, multiplexer systems 620 and 630, multiplexer 640, buffer 650, and glue logic 660. In an alternate implementation, buffer 650 and/or glue logic 660 are located external to merge logic 530.

Buffers 610 may correspond to the number of different streams (N=number of streams). Buffers 610 may receive data output from schedulers 520 (FIG. 5). In one implementation, each buffer 610 may temporarily store 16 bytes of data from the corresponding stream. In another implementation, buffer 610 may store data of a different data width. Multiplexer system 620 may include N (N:1) multiplexers (e.g., 16:1 multiplexers when N=16). Each of the multiplexers in multiplexer system 620 may, for example, receive a byte of data from each buffer 610 and output one of the bytes to multiplexer 640. Multiplexer system 630 may include N (N*M:1) multiplexers (e.g., 256:1 multiplexers when N=16 and M=16). Each of the multiplexers of multiplexer system 630 may, for example, receive 16 bytes of data (where M=16) from each buffer 610 and output one of the bytes to multiplexer 640. This allows packing, to occur on a one byte boundary. In alternative implementations, packing may occur on a two (or more) byte boundary.

The logic within multiplexer system 620 is simpler than the logic within multiplexer system 630. As a result, multiplexer system 620 may perform its function in a single clock cycle; whereas, multiplexer system 630 may require two clock cycles.

Multiplexer 640 may include M (2:1) multiplexers. Each of the multiplexers of multiplexer 640 may receive the output of one of the multiplexers from each of multiplexer systems 620 and 630 as inputs and select one of them for transmission to buffer 650. Multiplexer 640 may use a select signal from glue logic 660 in making its selection. For example, one multiplexer of multiplexer 640 may receive byte 0 from a multiplexer of multiplexer system 620 and byte 0 from a multiplexer of multiplexer system 630 and select one of them based on the select signal from glue logic 660. Each multiplexer of multiplexer 640 may receive the select signal from glue logic 660 for determining which of the two inputs to transmit to buffer 650.

In an alternate implementation, multiplexer 640 may include a single (2:1) multiplexer. In this case, multiplexer 640 may receive M bytes of data from each of multiplexer systems 620 and 630 as inputs and select the M bytes from one of multiplexer systems 620 and 630 based on the select signal from glue logic 660.

Figure 7:
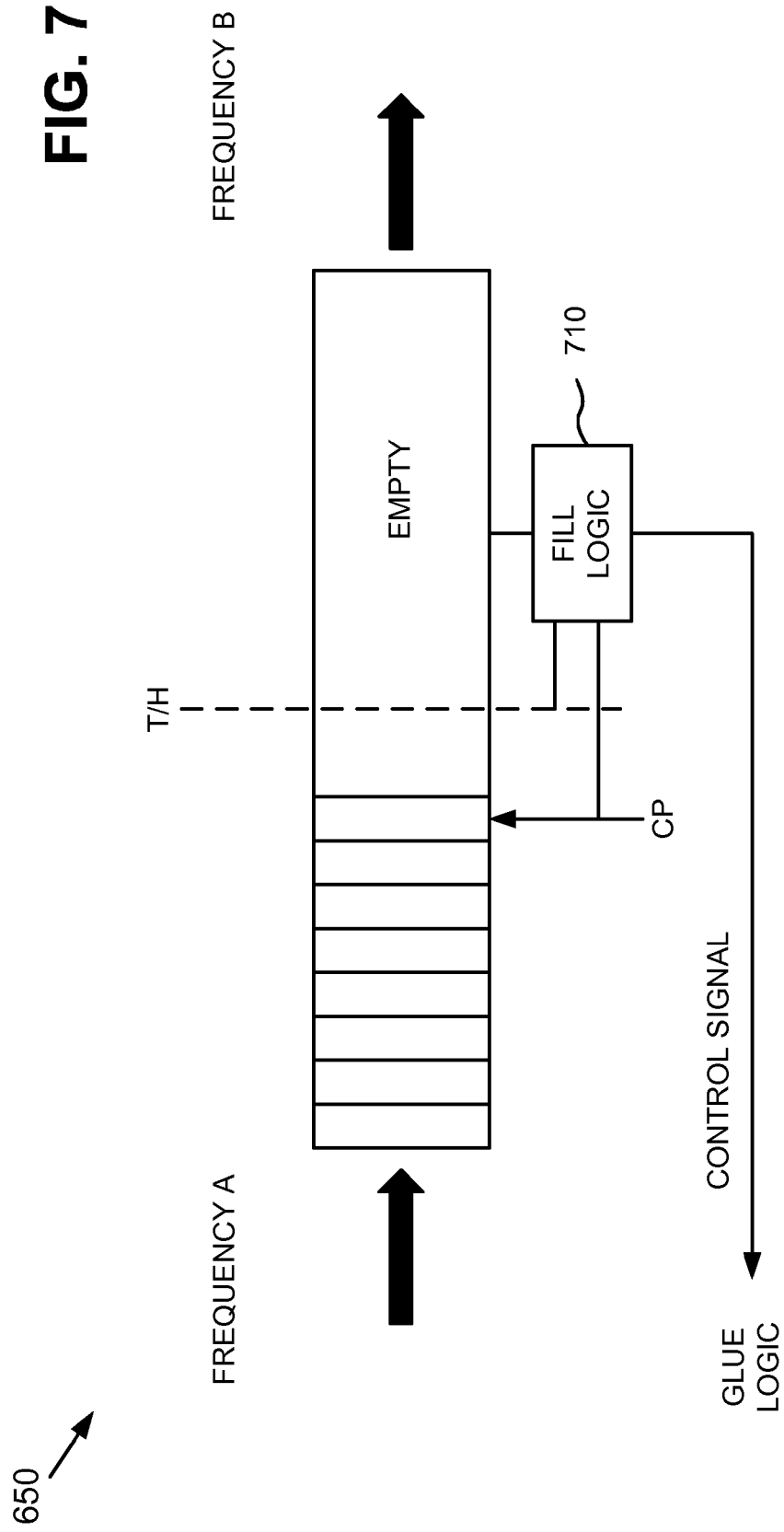
FIG. 7 is an exemplary diagram of the buffer of FIG. 6 according to an implementation consistent with the principles of the invention.

Buffer 650 may include an asynchronous buffer, such as a first-in first-out (FIFO) buffer, that can be read and written independently. FIG. 7 is an exemplary diagram of buffer 650 according to an implementation consistent with the principles of the invention. Buffer 650 creates a boundary between two clock domains. For example, buffer 650 may be written at a frequency A and read at a frequency B, where frequency A>frequency B.

In the implementation described previously, frequency B is equal to 87.5 MHz. Frequency A may be selected based on the size of the packets being processed and the desired throughput. For example, assume that the packets are 65 bytes in size and the desired throughput is 10 Gbs. Assume further that the maximum burst size is 64 bytes. In this case, it would take 6 clock cycles in the frequency A domain to process the 65 bytes (i.e., 5 clock cycles plus 1 stall cycle). The following relation may then be used to determine frequency A:

$$65 \text{ bytes}/(6 \text{ clock cycles}*16 \text{ bytes})*128 \text{ bits}*\text{frequency } A = 10 \text{ Gbs}.$$

To sustain the 10 Gbs rate, frequency A would need to be at least 120 MHz (resulting in a 10.4 Gbs rate).

In theory, multiplexer 640 loads buffer 650 every clock cycle. The faster frequency A permits multiplexer 640 to use an extra clock cycle (stall) when packing data. The extra clock cycle permits an additional logic stage to handle the complexity of the logic (in FIG. 6), meet timing, and handle geographical floorplan considerations. Even though frequency A is faster, using two clock cycles permits more time to perform complex logic operations compared to one clock cycle of frequency B. For example, a 120 MHz clock has 8 ns clock cycles. An 87.5 MHz clock has 11 ns clock cycles. Two clock cycles in the 120 MHz clock domain would result in 16 ns, which is larger than 11 ns in the 87.5 MHz clock domain. This extra time allows for additional logic over a greater chip area. Chip area is important with multiple streams because data paths 510, schedulers 520, and merge logic 530 used for multiple streams may require a lot of chip area.

Buffer 650 may be written every one or two clock cycles (in the frequency A domain) and read every clock cycle (in the frequency B domain). A problem that might result when writing data into buffer 650 at a frequency slower than data is read from buffer 650 is that buffer 650 may run dry. This may occur when packing occurs too often, such as on every clock cycle, thereby using two clock cycles for every write to buffer 650 (i.e., stalling 50% of the time). This would be the equivalent to operating at a 60 MHz clock to write to buffer 650 and an 87.5 MHz clock to read from buffer 650.

To resolve this problem, buffer 650 may include a threshold (T/H) that is used to prevent buffer 650 from running dry. If buffer 650 has a size Y, then the threshold value is set such that T/H<Y. In an alternate implementation, high and low watermarks (or thresholds) may be used. Buffer 650 may also include a current pointer (CP) that identifies the next data to be read from buffer 650.

Buffer 650 may further include fill logic 710. Fill logic 710 may compare the current pointer to the threshold value at every clock cycle (read and/or write). If the current pointer is less than the threshold value (meaning that buffer 650 is beginning to run dry), fill logic 710 may generate a control signal that it sends to glue logic 660, which indicates to glue logic 660 that no packing (or stalling) is to occur. In other words, when the current pointer is less than the threshold value, data is written into buffer 650 as is (i.e., with idles) every clock cycle (from multiplexer system 620). Because this writing occurs at a higher frequency (i.e., frequency A) than the reading (i.e., frequency B), buffer 650 will not run dry.

When the current pointer is not less than the threshold value, fill logic 710 may generate a control signal that it sends to glue logic 660, which indicates to glue logic 660 that it is to continue to pack data. In this case, multiplexer 640 may remove idles from the data (from multiplexer system 630).

Returning to FIG. 6, glue logic 660 may receive the control signal from buffer 650 and generate therefrom a select signal for use by multiplexer 640. Glue logic 660 may make its decision of whether to pack or not to pack at the boundary of each burst. Glue logic 660 may then generate a select signal, which may remain constant for the duration of the burst. In other words, in one implementation, glue logic 660 may reevaluate its pack/no pack decision once per burst.

Exemplary Transmit Processing

Figure 8:
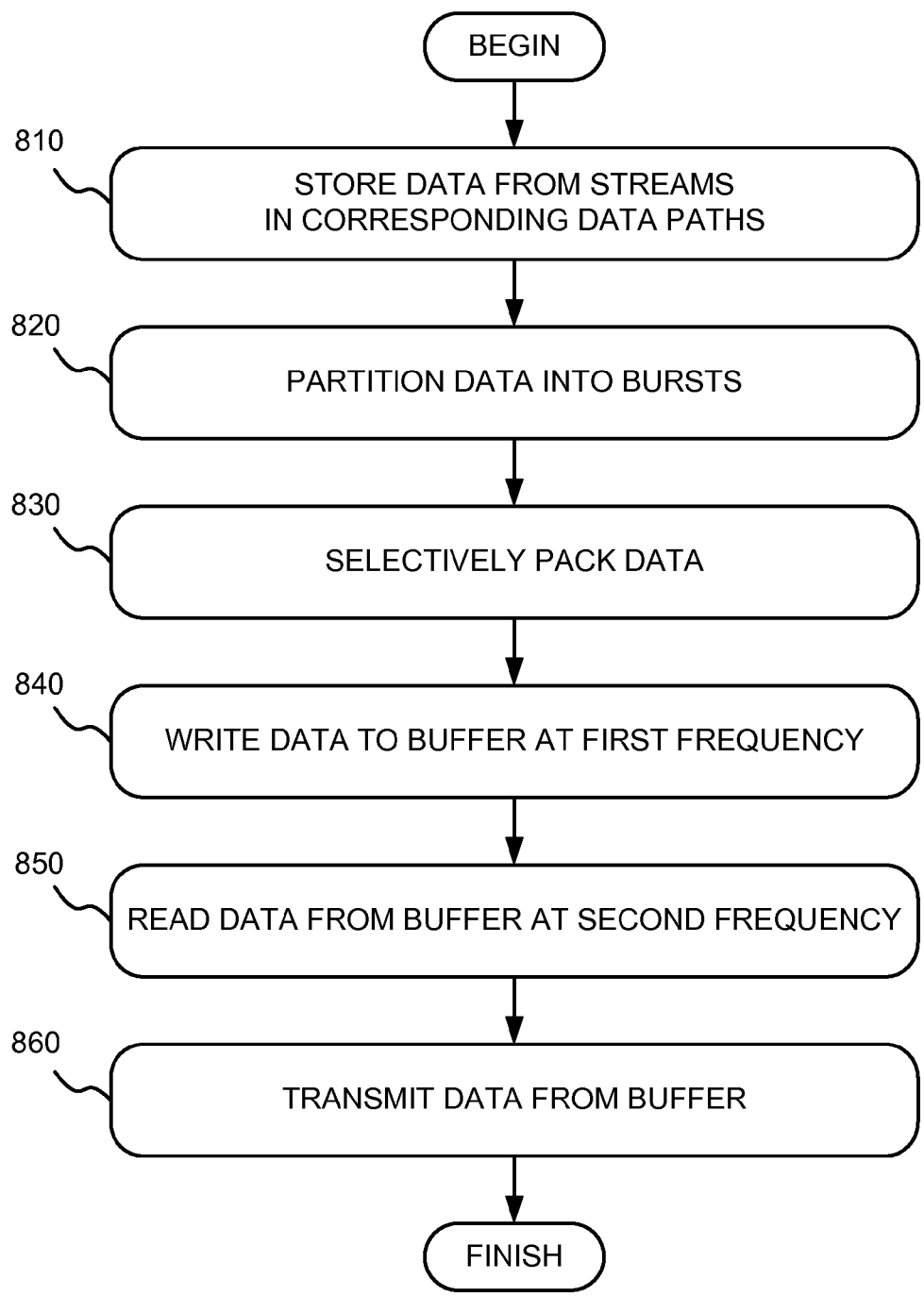
FIG. 8 is a flowchart of exemplary processing by the transmitter of FIG. 4 according to an implementation consistent with the principles of the invention.

FIG. 8 is a flowchart of exemplary processing by transmitter 430 according to an implementation consistent with the principles of the invention. Processing may begin with transmitter 430 receiving one or more streams of packet data. Transmitter 430 may store packet data from each of the streams in the corresponding data paths 510 (act 810). For example, data from stream 0 may be stored in one data path 510, while data from stream N may be stored in a separate data path 510. In one implementation, data path 510 may store 128 bits (i.e., 16 bytes) of the packet data at a time.

Each of schedulers 520 may receive the data from the corresponding data path 510. Scheduler 520 may partition the data into bursts (act 820). For example, scheduler 520 may partition the data into maximum-size bursts (e.g., 64 bytes) for the stream. The maximum burst size may differ from stream to stream. In one implementation, the maximum burst size is a multiple of 16 bytes. If the packet size is not a multiple of the maximum burst size, then a number of bytes of packet data, less than the maximum burst size, may exist at the end of the packet (EOP) or the end of the burst (BOB). In this case, a number of idles may exist at the end of the packet or the end of the burst.

Figure 9:
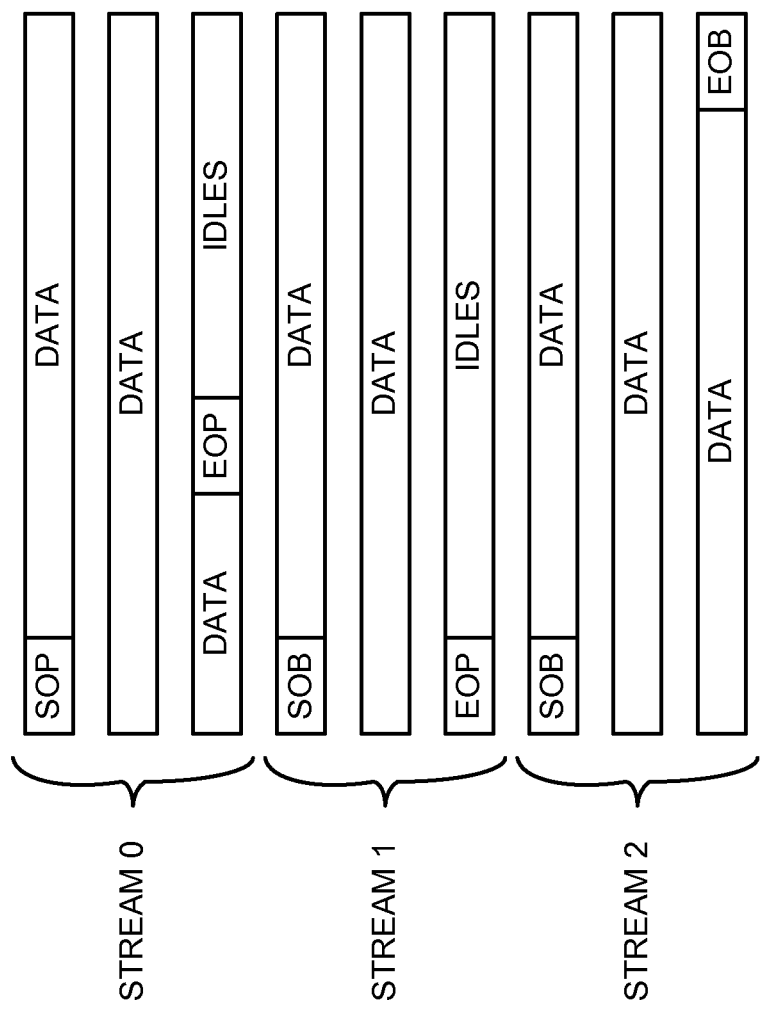
FIG. 9 is a diagram of exemplary data that may be output from the scheduler of FIG. 5 in an implementation consistent with the principles of the invention.

FIG. 9 is a diagram of exemplary data that may be output from scheduler 520 in an implementation consistent with the principles of the invention. In this example, data in a stream may begin with a start-of-packet (SOP) or a start-of-burst (SOB) and end with an end-of-packet (EOP) or an end-of-burst (BOB). If a packet does not include enough data to completely fill a burst (typically at the end of the packet or, possibly, the end of the burst), the burst may include idles. In this example, streams 0 and 1 include idles.

Returning to FIG. 8, merge logic 530 may receive data, which may contain idles, from schedulers 520. Merge logic 530 may select data from one of schedulers 520 based, for example, on the context signals received from schedulers 520. Merge logic 530 may multiplex and selectively pack the data from schedulers 520, possibly based on control information from schedulers 520 (act 830). Merge logic 530 may use a combination of multiplexers (e.g., multiplexers 620-640) to select particular data bursts from one or more streams and remove idles from the data bursts (i.e., pack the data).

Figure 10:
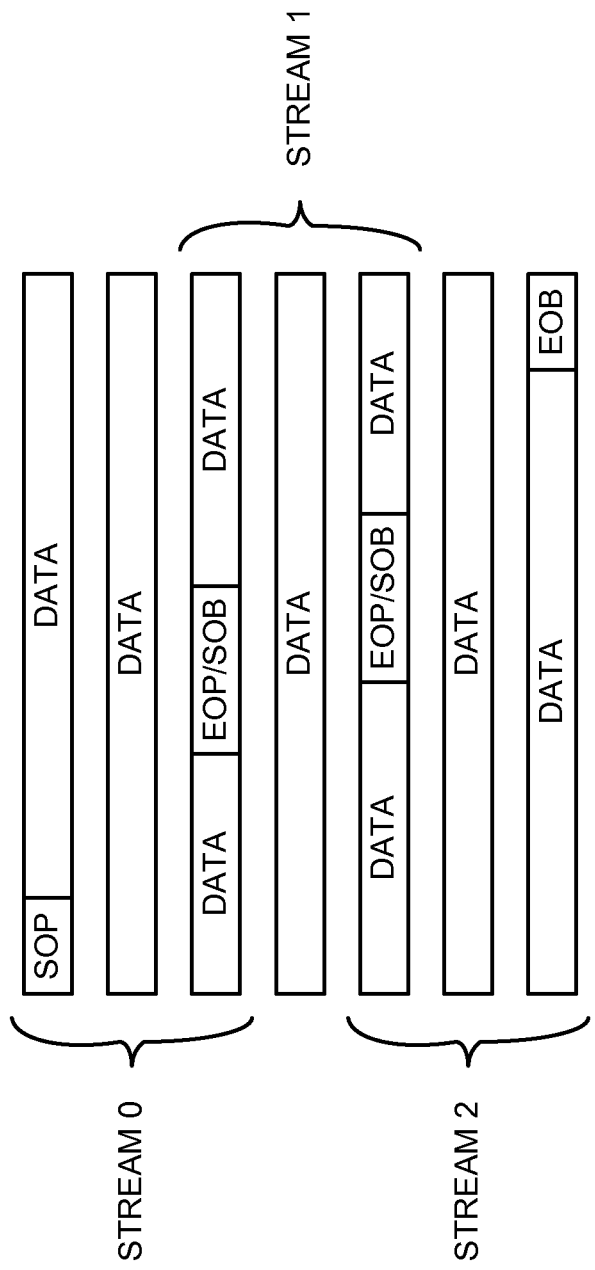
FIG. 10 is a diagram of exemplary data after being packed by the merge logic of FIG. 5 in an implementation consistent with the principles of the invention.

FIG. 10 is a diagram of exemplary data after being packed by merge logic 530 in an implementation consistent with the principles of the invention. In this example, none of the bursts contain idles.

Figure 11:
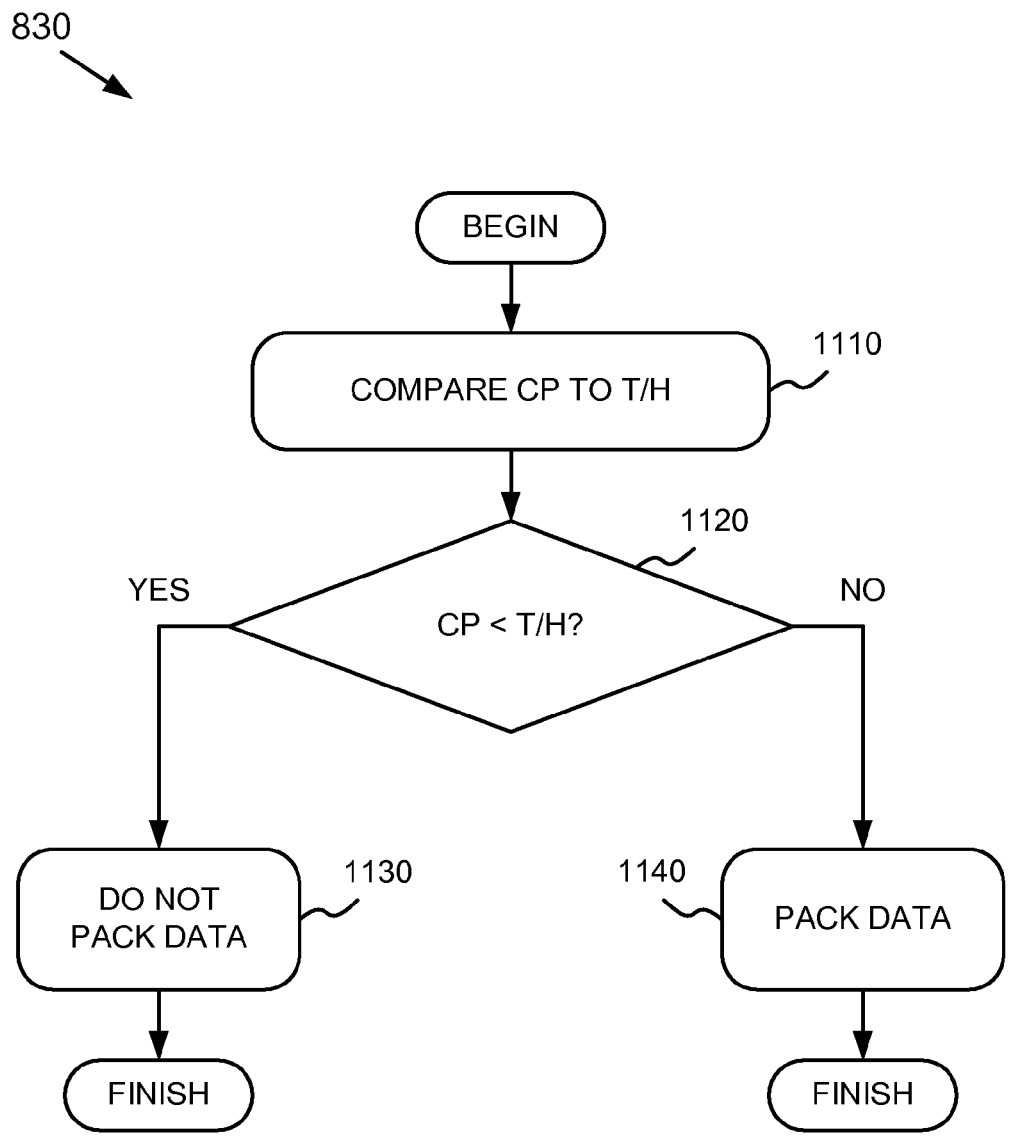
FIG. 11 is a flowchart of exemplary processing for selectively packing data according to an implementation consistent with the principles of the invention.

FIG. 11 is a flowchart of exemplary processing for selectively packing data according to an implementation consistent with the principles of the invention. As described above, the determination of whether to pack or not to pack may ultimately be made by buffer 650. Buffer 650 may compare the current pointer to the buffer threshold value at every clock cycle (acts 1110 and 1120).

If the current pointer is less than the threshold value, then data packing is terminated (act 1130). To accomplish this, buffer 650 may generate a control signal that it sends to glue logic 660. Based on the control signal, glue logic 660 may generate a select signal that it sends to the select control signal input of multiplexer 640. The select signal indicates to multiplexer 640 that no packing (or stalling) is to occur (i.e., select data from multiplexer system 620). When packing is terminated, data is written into buffer 650 as is (i.e., with idles) every clock cycle. Because the writing frequency (i.e., frequency A) is faster than the reading frequency (i.e., frequency B), buffer 650 will not run dry.

When the current pointer is not less than the threshold value, then data packing continues (act 1140). In this case, buffer 650 may generate a control signal that it sends to glue logic 660. Based on the control signal, glue logic 660 may generate a select signal that it sends to the select control signal input of multiplexer 640. The select control signal indicates to multiplexer 640 that it is to continue to pack data (taking two clock cycles in frequency A) (i.e., select data from multiplexer system 630), thereby removing idles from the data.

Returning to FIG. 8, merge logic 530 writes packed or unpacked data to buffer 650 (act 840). This data may include multiplexed data from multiple data streams. Transmitter logic 540 may read the data from buffer 650 (act 850). As described above, the writing and reading may occur at different frequencies. For example, the writing frequency (frequency A) may be faster than the reading frequency (frequency B). In one implementation, frequency A is 120 MHz and frequency B is 87.5 MHz.

Transmitter logic 540 may condition the data and transmit it on an output data path (act 860). In one implementation, transmitter logic 540 reads the data from buffer 650 on a wide, slow bus and outputs the data on a narrow, fast bus. For example, transmitter logic 540 may read the data from buffer 650 on a 128-bit bus at 87.5 MHz and output the data on a 16-bit bus at 700 MHz.

CONCLUSION

Systems and methods consistent with the principles of the invention selectively pack data from one or more streams to eliminate idles and maximize bandwidth use. Idles typically occur at an end of a packet or burst when the packet size differs from a fixed burst size (e.g., a predetermined maximum burst size) for the stream. The idles may be replaced with data from the same stream or a different stream.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, although described in the context of a routing system, concepts consistent with the principles of the invention can be implemented in any system, device, or chip that communicates with another system, device, or chip via one or more buses. Also, systems and methods consistent with the principles of the invention apply to single stream as well as multi-stream environments.

Also, systems and methods have been described as processing packets. In alternate implementations, systems and methods consistent with the principles of the invention may process other, non-packet, data.

Further, certain portions of the invention have been described as "logic" that performs one or more functions. This logic may include hardware, such as an application specific integrated circuit, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A transmit interface comprising:
    a plurality of schedulers, implemented at least partially in hardware, to:
        partition data, received via a plurality of data streams, into bursts;
    a buffer, associated with the plurality of schedulers and a data stream of the plurality of data streams, to:
        determine that at least one burst, associated with the data stream, includes one or more idles,
        compare a current capacity of the buffer to a buffer threshold value, and
        determine, based on the comparing, that the one or more idles are to be removed from the data stream; and
    merge logic, implemented at least partially in hardware, to:
        selectively pack, based on the determination that the one or more idles are to be removed, the at least with data from another data stream, of the plurality of data streams, to remove the one or more idles from the at least one burst.

2. The transmit interface of claim 1, where the merge logic is further to:
    multiplex the bursts, including the at least one burst, to create multiplexed streams, and
    where the transmit interface further comprises:
        a transmitter to transmit the multiplexed streams.

3. The transmit interface of claim 1, where merge logic includes:
    one or more multiplexers to:
        receive the bursts, including the at least one burst, from the plurality of schedulers, and
        selectively pack the at least one burst, and an asynchronous buffer to:
            store the bursts.

4. The transmit interface of claim 3, where the merge logic is further to:
    write the at least one burst to the asynchronous buffer at a first frequency, and
    read the at least one burst from the asynchronous buffer at a second frequency,
        the second frequency being different from the first frequency.

5. The transmit interface of claim 3, where the asynchronous buffer includes: a current pointer to: identify next data to be read from the asynchronous buffer, and fill logic to: compare the current pointer to the buffer threshold value, and generate a control signal to instruct the one or more multiplexers to perform no data packing when the current pointer is less than the buffer threshold value.

6. The transmit interface of claim 5, where, when the one or more multiplexers perform no data packing, the one or more multiplexers are to:
    store data from the bursts in the asynchronous buffer without removing idles present in the bursts from the bursts.

7. The transmit interface of claim 3, where the one or more multiplexers are to selectively pack the at least one of the bursts to remove the one or more idles from the at least one of the bursts, and
    where, based on selectively packing the at least one of the bursts, the one or more multiplexers are to:
        store data associated with the at least one of the bursts in the asynchronous buffer with no idles.

8. A method, performed by one or more devices, the method comprising:
    partitioning, by the one or more devices, data, received from a plurality of data streams, into bursts;
        determining, by the one or more devices and based on the partitioning, that at least one burst, associated with a data stream, of the plurality of data stream, includes one or more idles;
        comparing, by the one or more devices, a current capacity of a buffer associated with the data stream to a buffer threshold value; and
        packing, by the one or more devices and when the current capacity of the buffer is not less than the buffer threshold value, the at least one burst with data from another data stream, of the plurality of data streams, to remove the one or more idles.

9. The method of claim 8, further comprising:
    multiplexing bursts from different data streams, of the plurality of data streams, to create multiplexed data streams; and
    transmitting the multiplexed data streams.

10. The method of claim 8, where the buffer associated with the data stream comprises an asynchronous buffer, the method further comprising:
    writing the bursts, including the at least one burst, after packing the at least one burst, to the asynchronous buffer;
    reading the bursts, including the at least one burst, from the asynchronous buffer; and
    transmitting the read bursts from the one or more devices.

11. The method of claim 10, where writing the bursts comprises:
    writing the bursts to the asynchronous buffer at a first frequency, and
    where reading the bursts comprises:
        reading the bursts from the asynchronous buffer at a second frequency, the first frequency and the second frequency differing.

12. The method of claim 10, where the buffer threshold value and a current pointer, that identifies next bursts to be read, are associated with the asynchronous buffer; and where packing the at least one burst includes: comparing the current pointer to the buffer threshold value, and not packing the at least one burst when the current pointer is less than the buffer threshold value.

13. The method of claim 12, further comprising: packing the at least one burst to remove the one or more idles from the at least one burst when the current pointer is not less than the buffer threshold value.

14. The method of claim 10, where writing the bursts includes: storing data, from the at least one burst, in the asynchronous buffer without removing any of the one or more idles when the current capacity of the buffer is less than the buffer threshold value.

15. The method of claim 14, where packing the at least one burst occurs during a first clock cycle, and
where storing the data, from the at least one burst, occurs during a second clock cycle that is subsequent to the first clock cycle.

16. The method of claim 10, where packing the at least one burst and writing the data from the at least one burst occurs during two clock cycles.

17. A network device comprising:
a plurality of physical interface cards (PICs) coupled to a packet processor of the network device, each physical interface card (PIC), of the PICs, being to:
receive, via the packet processor, packets from a plurality of packet streams,
partition the packets into bursts,
multiplex the bursts,
determine that at least one burst, from a packet stream, of the plurality of packet streams, includes one or more idles,
compare a current capacity of a buffer associated with the packet stream to a buffer threshold value;
pack, when the current capacity of the buffer is not less than the buffer threshold value, the at least one burst with data from another packet stream, of the plurality of packet streams, to remove the one or more idles, and
transmit the multiplexed bursts and the packed at least one burst.

18. A transmitter connected between a first bus and a second bus, the transmitter comprising:
a plurality of schedulers, implemented at least partially in hardware, to:
receive data on the first bus, and
partition the data into bursts;
a buffer, associated with the plurality of schedulers, to:
determine that at least burst, of the bursts, includes one or more idles,
determine, based on a comparison, to pack the at least one burst with data to remove at least one idle from the at least one burst,
the comparison comparing a current capacity of the buffer to a buffer threshold value; and
merge logic, associated with the plurality of schedulers, to:
pack, based on the determining to pack the at least one burst, the at least one burst with the data to remove the at least one idle from the at least one burst, and
transmit the bursts, including the at least one burst, without the at least one idle, on the second bus,
the second bus being narrower and faster than the first bus.

19. The transmitter of claim 18, where the merge logic includes:
one or more multiplexers to selectively pack the at least one burst with data based on a capacity of a memory associated with transmitting the bursts.

20. The transmitter of claim 18, where the merge logic is further to:
write the bursts, including the packed at least one burst, in an asynchronous buffer at a first frequency; and
read the bursts, including the packed at least one burst, from the asynchronous buffer at a second frequency, the first frequency differing from the second frequency.

21. The transmitter of claim 20, where the first frequency is greater than the second frequency.

* * * * *